United States Patent [19]
Loew

[11] 3,959,537
[45] May 25, 1976

[54] DIELECTRICALLY BONDABLE DECORATIVE STRIPS

[75] Inventor: Theodore Loew, Schenectady, N.Y.

[73] Assignee: The Standard Products Company, Cleveland, Ohio

[22] Filed: Mar. 6, 1974

[21] Appl. No.: 448,488

[52] U.S. Cl. .............................. 428/31; 156/272; 156/313; 428/161; 428/193; 428/246; 428/345; 428/356
[51] Int. Cl.² ..................................... B60R 13/00
[58] Field of Search.................. 156/272, 306, 313; 161/101, 119, 120, 121, 123, 149, 88, 162; 52/716; 296/146; 280/150 B; 428/31, 161, 193, 246, 345, 356

[56] References Cited
UNITED STATES PATENTS

| | | |
|---|---|---|
| 3,305,381 | 2/1967 | Wagenen ............................ 161/160 |
| 3,419,458 | 12/1968 | Brooks et al. ........................ 161/121 |
| 3,471,355 | 10/1969 | Truesdell et al. ..................... 161/40 |
| 3,543,465 | 12/1970 | Jackson ............................ 161/121 |

Primary Examiner—James J. Bell
Attorney, Agent, or Firm—Harness, Dickey & Pierce

[57] ABSTRACT

A decorative molding having its body and under surface formed of a thermoplastic material which is bondable dielectrically with compatible materials carries bonded to such under surface a longitudinally extending composite fabric tape of a width less than that of the molding, the tape having on its underside a heat reactive adhesive compatible with and bondable to materials with which the body itself is incompatible.

4 Claims, 4 Drawing Figures

DIELECTRICALLY BONDABLE DECORATIVE STRIPS

BACKGROUND OF THE INVENTION

In the manufacture of decorative trim panels for use as interior decoration on automobile doors, boat interiors, baby carriages, etc., it has become common practice to bond onto the surface of a vinyl sheeting, by dielectric means, a decorative colored or metallized vinyl extruded molding.

Currently the usual practice is to use a base board of compressed wood fibers known in the trade as "hard board", a layer of bonded fibers or soft foam of urethane or vinyl thereover to provide a cushioning effect, and a top layer of vinyl sheeting with or without a backing fabric as the finished surface of the panel. The vinyl sheeting may have an embossed grain, and further decorative effects are obtained by embossing lines, simulated stitching, geometric patterns, etc. on the face of the panel and at the same time bonding the molding strip or strips thereto. The strips or moldings may be in the form of straight lines, curved pieces or frames, as desired.

To further enhance the decorative effect it may be desired to use different colors or grains of vinyl sheeting in different areas of the panel. If the different colored areas are delineated by the moldings, it is practical and convenient to conceal the color break by using the molding to cover the adjoining edges of the different colored materials. This simplifies manufacture by reducing the required degree of accuracy of cutting and placing the different colored materials during fabrication.

Using existing techniques, however, it is necessary that the different substrates placed under the decorative molding or strip have essentially the same dielectric bonding properties.

Such limitations become undesirable as designs become more sophisticated, and it is an object of the present invention to provide improved means for bonding such decorative metallized or colored strips or moldings to adjacent areas of substrate materials having markedly different dielectric bonding characteristics.

On one side of the strip there might be, for instance, the vinyl sheeting which up to now has been the normal material for this type of structure, while on the other side of the "color break" there could be a fabric such as nylon sateen, which is notably difficult to bond to.

Other objects and advantages will become apparent upon consideration of the present disclosure in its entirety.

BRIEF DESCRIPTION OF THE FIGURES OF DRAWING

DETAILED DESCRIPTION OF THE PREFERRED FORMS OF THE INVENTION

Figure 1:
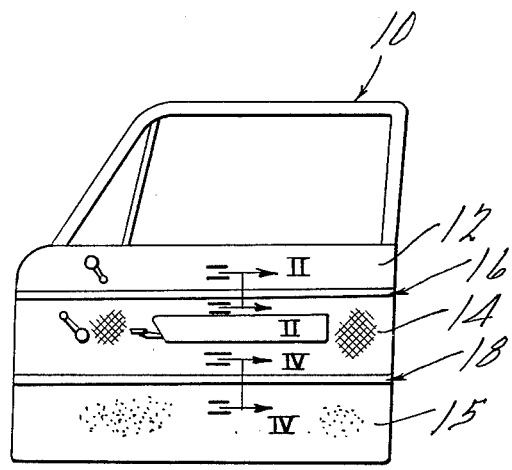
FIG. 1 is an elevational view of the inner surface of a motor vehicle door upholstered in a manner which utilizes the present invention.

A motor vehicle door generally designated 10 is illustrated to typify an important field of use of the invention. A window sill area of the inner surface of the door is covered with a leatherlike vinyl sheeting 12, below which is a mid-portion upholstered in a brocade-like nylon sateen material 14, while a lower portion has a covering of carpet 15 to match the floor.

The two upper materials 12, 14 abut one another along a horizontal line at which their adjacent edges are covered by an improved trim strip or molding 16 constructed in accordance with the present invention. The abutting edges of the brocade and carpet materials 14, 15 are similarly covered by an ornamental molding 18, the construction of which may be modified for compatibility with the materials, in a manner which will be more particularly described.

The invention contemplates incorporating in the structure of the decorative strips or moldings as 16, 18 dissimilar materials at the bonding surface, in such manner as to render the localized overlying areas of the molding compatible with and thermally bondable to the dissimilar substrates.

Figure 2:
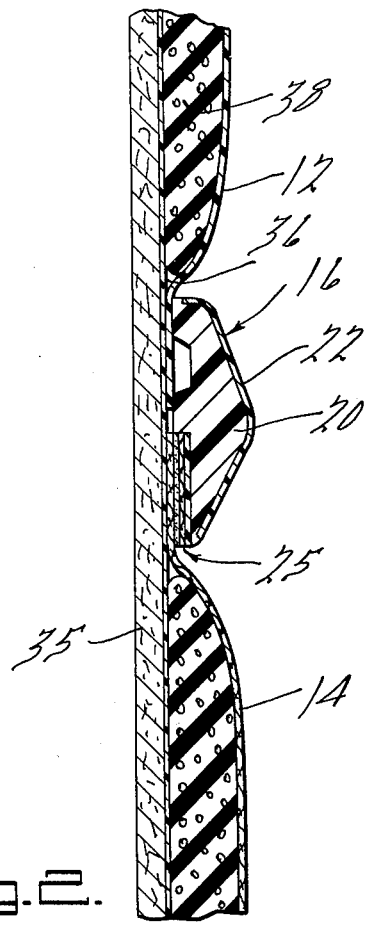
FIG. 2 is a cross section taken substantially on the line II—II of FIG. 1 and looking in the direction of the arrows.
Figure 3:
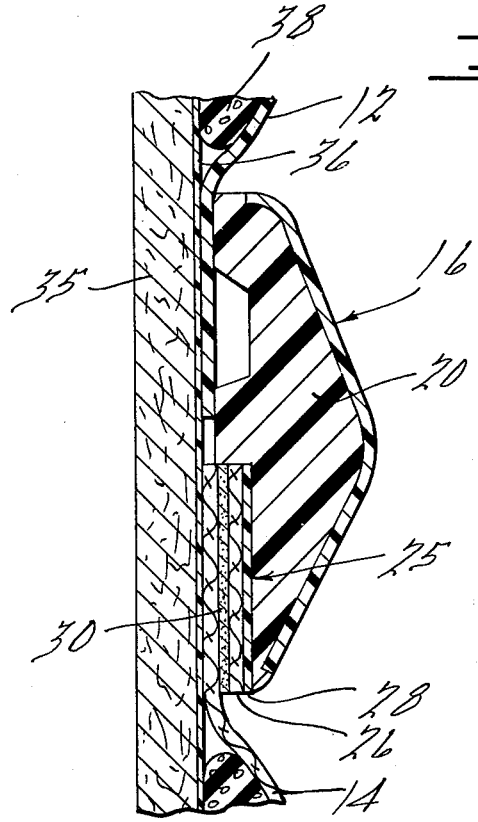
FIG. 3 is a section of the trim strip on the same line on a larger scale.

At the juncture of the vinyl sheeting 12 and nylon fabric 14, for example, the molding 16 is constructed as shown in FIGS. 2 and 3, consisting of a main body portion 20 of extruded vinyl plastic, the upper part of the bottom surface of the molding, which is to overlie the vinyl sheeting 12, being left with its vinyl surface untreated. The outer surface of the molding body may be overlaid by a metallized coating as 22, and/or otherwise coated, colored or molded as desired by the stylist. The untreated vinyl bottom area of the body 20, constituting approximately the upper half of the surface, is compatible with and readily bonds dielectrically to the vinyl surface of the sheeting 12.

The other side of the bottom surface, constituting approximately the lower half of the molding when it is installed horizontally as shown, and which would not be compatible with the nylon fabric 14 if left in the untreated condition, is modified by having laminated to its bottom surface during the extrusion and fabricating process a tape-like securing member comprising a trilaminate tape generally designated 25. The tape has a body portion 26 formed of a coarse-woven cotton fabric, having a vinyl coating 28 on its upper surface which is to be bonded to the vinyl body 20 of the molding, and on its lower surface a heat reactive adhesive coating 30 compatible with the nylon fabric in the sense that it is thermally bondable thereto. The coatings 28 and 30 may be calendered to the coarse-woven cloth body 26 of the tape, to assist in developing a good mechanical bond between the fabric and the coatings. The vinyl coating 28 is similar in composition to and of approximately the same hardness as the vinyl compound comprising the body 20.

The composition of the coating 30 is selected for compatibility with a particular fabric or other surface to which it is to be bonded. Where a nylon fabric is employed as in the illustrative embodiment herein under consideration, a member of the polyamide adhesive family is employed. Where the fabric is of cotton and regenerated adhesive fibers, synthetic rubber-based adhesives modified with high-melting terpene resins are used. For polyester fabrics either polyamides or polyurethanes are used.

Where polyolefin fabrics are to be bonded, the coating 30 must be of a similar polyolefin. Since polyolefins do not in themselves respond or heat effectively in a dielectric bonding press, such coatings must be modified to increase their absorption of high frequency energy. This can be done by incorporating in the coating about 2 to 5 per cent by weight of a finely divided metal powder such as hydrolized iron powder. Such a powder having poor dielectric properties heats up rapidly in the radio frequency field to heat the polyolefin coating sufficiently for hot melt bonding. This same principle of incorporating low dielectric powders in the adhesive coat may be utilized with any other adhesive, in order to obtain a shorter working cycle, or where the material is not properly electronically heatable, or to obtain a better balance of melting times when adhesives of substantially different melt characteristics are employed. For example, when polyamide resins for bonding nylon are used on one, and vinyl on the other, it may be desirable to incorporate some metal powder as an accelerator in the polyamide, which is slower heating and higher melting than the vinyl which is being bonded at the same time on the other side.

In forming the tape 25, a wide width of fabric may be coated, and subsequently slit into desired widths. The coating may be done by calendering or hot roll coating, or other suitable method, the coating having the higher melting point being applied first.

As best shown in FIG. 3, a base for the door covering and upholstering materials may be provided by a hard fiberboard or so-called "hard board" 35 having a vinyl coating 36 on its outer surface, that is, its surface facing the interior of the door. Interposed between the hard board and the vinyl sheeting 12 may be a suitable padding 38, which may be of soft vinyl or urethane foam or bonded fibers. The vinyl material 12 which underlies the molding 16 is directly bonded to the vinyl surface 36 of the hard board when the molding is applied and heated. The under surface of the fabric material 14 is also provided with a vinyl coating, so that when the molding and underlying materials are heated, the bottom surface of the fabric is bonded to the vinyl layer 36 of the hard board.

Figure 4:
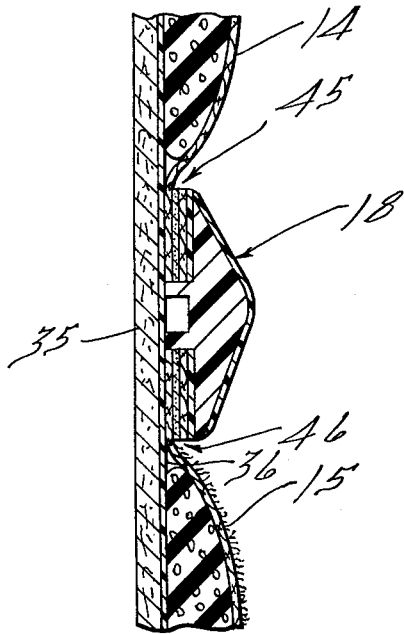
FIG. 4 is a cross section taken substantially on the line IV—IV of FIG. 1 and looking in the direction of the arrows.

As shown in FIG. 4, the juncture of the nylon fabric 14 and carpeting material 15 may be overlaid and finished by a molding 18 which is provided with two trilaminate tapes 45, 46, each of which has a fabric body corresponding to the body 26 of the tape 25, with a vinyl top layer corresponding to layer 28 compatible with and bondable to the vinyl body of the molding 18. The bottom layers of the strips 45, 46, respectively, corresponding to layer 30, are formed of heat meltable adhesives compatible with the fibers of the specific fabrics and selected from the group described above. Where the material 14 is of nylon, as indicated above, the upper tape 45 may be constructed of the same materials as the tape 25 previously described, with a polyamide bottom coating for bonding to the nylon cloth. If the carpeting material 15 is also of nylon, a similar tape may be used, but if it is of a different fabric, the bottom layer of the lower tape is modified accordingly, and employs as its bottom coating a heat reactive adhesive which will adhere to the specific fabric, such as one selected from the examples given above.

This Detailed Description of Preferred Forms of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. In an elongated trim strip having a body adapted to overlie the linear juncture defined by abutting edges of two dissimilar substrate surfaces, said body being formed of a material which is not thermally bondable to both such substrate surfaces, means for securing the body to both of such substrate surfaces and in overlapping relationship thereto, comprising two dissimilar bottom surface portions rigidly carried by said body and extending longitudinally thereof, said bottom surface portions being formed of different thermally bondable thermoplastic materials, one of such materials being compatible with and thermally bondable to one of the dissimilar substrate surfaces and the other of said materials being thermally bondable to the other of said substrate surfaces.

2. A trim strip as defined in claim 1 wherein the body is formed of a dielectrically heatable and bondable thermoplastic a part of which is exposed on the bottom to define one of said segregated bottom surface portions, and a tape-like fastening element secured to and covering another part of the bottom of the body and defining the other of said bottom surface portions, said tape-like element having a top surface portion thermally secured to the bottom of the body.

3. A trim strip as defined in claim 2 wherein the tape-like fastening element as a woven member having different thermal bonding agents secured to its opposite surfaces.

4. A trim strip as defined in claim 2 wherein the body is formed of a thermoplastic vinyl resin, the tape-like fastening element comprising a woven fabric ribbon having a vinyl coating on its upper side bondable to the body and a heat reactive adherent material on its other side bondable to one of said substrate surfaces.

* * * * *